April 8, 1958 M. KAHN 2,830,129

TELEPHONE DIALING DEVICE

Filed Jan. 18, 1956 2 Sheets-Sheet 1

INVENTOR:
Morris Kahn
BY Maurice Block
Attorney

INVENTOR:
Morris Kahn
BY [signature]
Attorney 2,830,129

TELEPHONE DIALING DEVICE

Morris Kahn, Brooklyn, N. Y.

Application January 18, 1956, Serial No. 560,008

8 Claims. (Cl. 179—90)

My invention relates to devices which produce the series of dial rotations necessary for calling a telephone party automatically upon one simple hand impulse, thereby replacing a series of finger movements, making memorizing of party numbers unnecesary, avoiding errors and delays during the dialing and facilitating and accelerating the establishment of telephone connections.

Other objects of my invention are to provide a dialing device which can be simply placed in proper position to a telephone of standard structure, which does not require any change of this structure, which does not interfere with the inner operation of the telephone, and which has easily removable and re-attachable parts so arranged that removal of these parts exposes the telephone dial for ordinary finger operation.

Further objects are to avoid any unusual or objectionable attachment to the telephone, to use a casing interfering with the telephone not more than protective casings already in use, and to use a mechanical finger interfering with the telephone not more than, for example, a pencil which is often used instead of a finger.

Still other objects are to determined the lengths of a series of dial rotations by the lengths of crests of a wavy groove provided in an exchangeable element, to derive control of the dial movements from a pin or axle engaging this groove, to form this element like a flat card, and thereby to provide a simple easily stored and shipped element which can be quickly inserted in the device for adapting the same to any particular party number.

Still further objects are to move this plate by hand in one direction and to move it back automatically, to provide a transmission gear which establishes a definite ratio between dial and plate movement, to drive the dial by this gear during the plate's back movement, and to construct this gear and the back driving means so that they require little space, are simple, reliable and inexpensive and can be easily assembled.

Still other objects are to form the grooved plate of as many parts as there are digits of the telephone numbers, to assemble these parts exchangeably, and thereby to facilitate the formation of plates for any party numbers to be dialed.

Still other objects and advantages will appear from the following description of an exemplifying embodiment of my invention, from the appended claims and from the accompanying drawing in which:

Fig. 4 is represented on a smaller, and Fig. 5 on a larger scale than the remaining figures.

Figure 1:
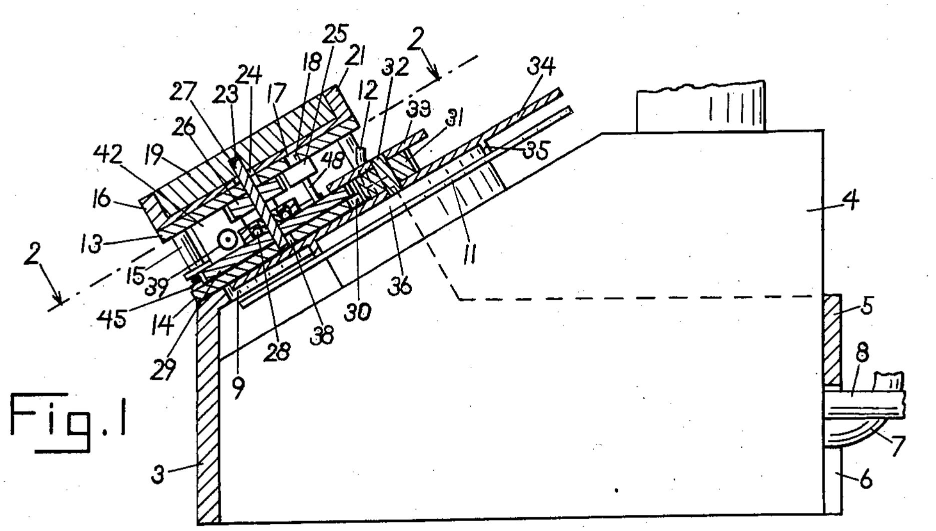
Fig. 1 shows a simplified side view of a telephone apparatus, the upper, forked part being broken off, and a cross-section of an illustrative embodiment of my invention positioned for dialing this apparatus, this crosssection being taken along the line 1—1 in Fig. 2.

The shown embodiment has a casing 3 with a side wall surrounding the foot part of a telephone apparatus 4. The bottom of the casing is open. The rear part 5 of its side wall has a slot 6 extending from the bottom and serving for the passage of the telephone cables 7 and 8. The top of the casing is open, except that a partial top wall 9 extends from the front backward about as far as corresponds to the center of the telephone dial in an obliquely rising direction. The wall 9 has a cut-out forming a half circle about the axis of the dial disk 11. Two hooks 12 are affixed on top of the wall 9.

An upper plate 13 and a lower plate 14 are connected in spaced position by four rivets 15 whereby a frame is formed. This frame overlies the casing 3 and is held in position by the hooks 12 which pass through corresponding holes of the plate 14. A sled 16 is guided on the plate 13, for example, by two pins 17 affixed to the sled and slidably inserted in a slot 18 of the plate 13. A card-shaped plate 19 is exchangeably inserted in the sled 16 which has a wall 21 surrounding the plate 19 except where the wall 21 has a gap 22 for easier removal of this plate. A wavy groove 23 which later will be described more fully extends in the bottom surface of the plate 19 in the moving direction of the sled. This groove is accessible from below through a broader slot 24 of the sled's bottom.

The pins 17 connect the sled 16 with a rail or rack 25 which is slidable under the plate 13. This rack has teeth facing the peripheral side of a toothed wheel 26 affixed to an axle 27. Another toothed wheel 29 is positioned on the same axle. Preferably, the wheel 29 is not permanently coupled with this axle, but only when the axle rotates counterclockwise in Fig. 2. This may be achieved in any known and suitable manner, for example, by the arrangement of a one-way coupling 28 in which balls are wedged or loose in well known manner between rings affixed to the coupled or separated elements.

A further toothed wheel 31 is positioned aside of the wheel 29 at the same level and extends down through a semicircular cutout 30 of the frame plate 14. The wheel 31 is affixed to an axle 32 which is also connected with a smaller upper disk 33 and a larger lower disk 34. The disk 34 has an annular downward projection 35 fittingly embracing the central projection 36 of the telephone dial whereby the parts 34 and 35 form a cap. A finger or projection 37 extends down from the disk 34 into the last or "Z" hole of the dial disk 11 whereby the member comprising the disk 34 and the wheel 31 is coupled with the disk 11.

The axle 27 is inserted in identical small slots 38 of the plates 13 and 14. These slots extend in a direction toward the axle 32 and in a direction crossing the moving direction of the sled 16. The drawings show the axle 27 in the position farthest from the axle 32. Shift of the axle 27 toward the axle 32 brings the wheels 29 and 31 into engagement while the rack 25 and the wheel 26 engage simultaneously. The drawing shows the size of the teeth and the distances of the engaging elements exaggerated for the sake of clear representation.

Means are provided which return the sled 16 automatically to the shown position at the left end of the slot 18 when the sled has been shifted by hand to the right end position. Any known and suitable driving means may be used for this purpose, and may be activated, switched or controlled by the moving sled. For example a coiled spring 39 is positioned between a movable disk 41 and a wall 42 extending between and affixed to the frame plates 13 and 14. A thin cable 43 has one end affixed to the disk 41, passes through a bore of the wall 42 and has another end affixed to a drum 44. Another drum 45 of larger diameter is affixed to the drum 44 and is rotatable with the latter about a shaft 46 inserted in bores of the plates 13 and 14. Another cable 47 is affixed to and slung about the drum 45 and has an end affixed to a pin 48 which forms a downward projection of the rack 25.

Braking means may be provided for retarding the action of the spring 39. For example, a pneumatic brake may be used which comprises a plunger 49 and an air receptacle 51. This receptacle is affixed to and between the plates 13 and 14 and contains an inner space into which the plunger 49 enters. The outer end of the plunger terminates in the disk 41. A valve 52, schematically indicated in Fig. 2, allows quick entrance of air into the receptacle 51 when the cable 43 pulls the plunger outward. When the spring 39 pushes the plunger inward, the valve closes and air can escape from the receptacle only slowly through a narrow bore 53 of the valve.

The axle 27 reaches upward through and beyond the slot 38 of the plate 13, passes with some clearance through the slot 24 of the sled 16 and reaches into the groove 23 of the plate 19, slidably engaging this groove. The plate 19 has a flat, rectangular shaped like a card, its thickness being exaggerated in the drawing for the sake of clearer representation. Hence, the plate 19 can be easily mailed, for example, by a telephone subscriber to his correspondents, and many plates can be stored in handy manner without requiring much space.

Figures 2, 3:
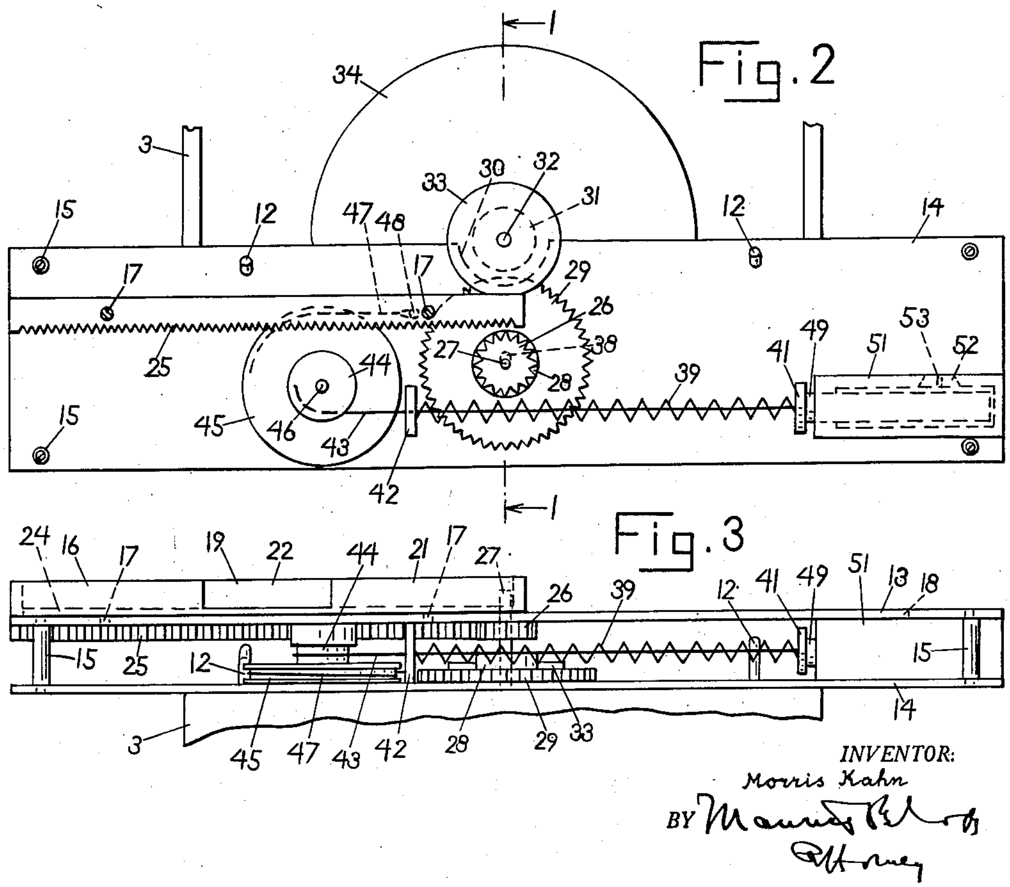
Fig. 2 shows a top view of the same embodiment seen in the direction of the arrows 2, in Fig. 1, the parts positioned over the line 2—2 being removed.
Fig. 3 shows a side view of the same embodiment seen from the lower side in Fig. 2.
Figure 6:
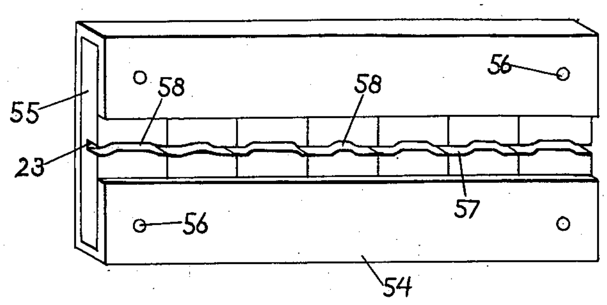
Fig. 6 shows a perspective bottom view of a frame containing a series of plates of the type illustrated by Fig. 5.
Figure 7:
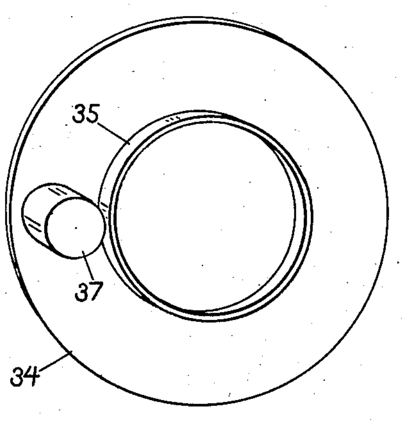
Fig. 7 shows a perspective view of a dial-engaging member.

The grooved plate may be one piece as shown in Figs. 1 and 3, or may be assembled from several pieces as shown in Fig. 6. The latter structure comprises a frame 54 and a series of narrow plates, one of which is indicated by 55. These narrow plates are inserted in the frame 54 aside of each other so that the groove of each of them forms the continuation of the grooves of the adjacent ones. There are as many narrow plates of the type 55 as the telephone numbers have digits, each of these plates representing one definite numeral. The assemblage may be locked, for example, by pins 56 passing through aligned bores of the frame and of the first and last of the inserted plates.

The groove 23, whether made in one piece or assembled, has a wavy shape comprising portions 57 engaging and holding the axle 27 in the shown position, other portions 58 forming the "crests" of the groove waves and holding the axle 27 in the position in which the wheel 29 engages the wheel 31, and further portions forming the transitions between the portions 57 and 58. The crest portions 58 are the groove parts nearest to the dial axis, and each crest extends as far as is proportional to the rotary way required for dialing a definite number-digit. In the case of the assembled structure of the grooved plate, each divisional plate of the type 55 contains one wave crest.

The upper side of the plate 19 or of the frame 54 is opposite to the grooved side and may be provided with a label 59 identifying the party having the number corresponding to the wave crests.

Figure 4:
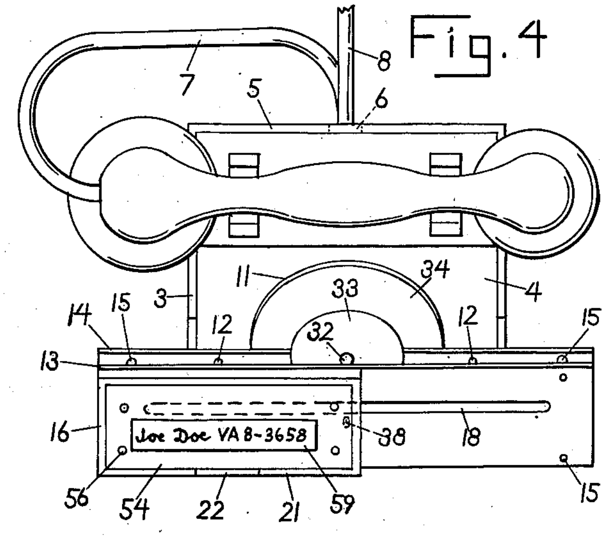
Fig. 4 shows a top view of the same embodiment and of the telephone apparatus.
Figure 5:
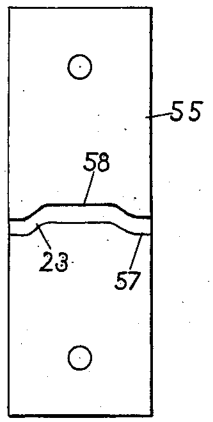
Fig. 5 shows a bottom view of a grooved plate.

The described device operates as follows:

The drawings show the device in condition of rest before a call is made, the particular grooved plate for the call being already inserted. The caller lifts the telephone receiver and pushes the sled 16 to the right side in Fig. 4 until the end of slot 18 stops the sled. The connection with the desired party is thereafter established automatically as will be described later.

The rack 25 moving with the sled 16 to the right side pulls the cable 47, thereby turning the drums 44 and 45 and pulling the cable 43 and the disk 41. Thereby the spring 39 which has some initial compression is more compressed, and the plunger 49 is drawn to the left end of the receptacle while air freely flows into the latter through the valve 52. The temporary engagement of the rack with the wheel 26 during this initial movement, though rotating the wheel 26 and the axle 27 does not rotate the wheel 29 because the coupling 28 does not couple this axle with the wheel 29 in this direction.

As soon as the caller's hand releases the sled 16, the spring expands again, pushing the disk 41 to the right side and thereby pulling the cables 43 and 47. The latter pulls the rack and the sled back to their left end positions. This movement is retarted by the plunger 49 because air pressure built up in the receptacle 51 by the inward moving plunger counteracts the spring pressure as long as not sufficient air has escaped through the narrow opening 53.

In the gradually to the left moving sled, the groove 23 slides along the upper end of the axle 27. When the groove transition from a wave bottom 57 to a crest 58 bypasses this axle, the latter is shifted in the slots 38 toward the dial axis whereby the wheel 29 engages the wheel 31 and the wheel 26 engages the rack 25. When the groove then moves as far as the end of the crest, the rack rotates the wheel 26, the axle 27 and, over the coupling 28, the wheel 29 which in turn rotates the wheel 31, thereby turning the dial. During the following transition from the crest to the bottom of the groove, the axle 27 is shifted back, the wheels 29 and 26 are disengaged, and the disengaged wheel 31 with the dial snaps back into its position of rest. This process is repeated during the passage of the following groove waves until, at the end of the sled's way, all seven digits have been dialed. The gear constituted by the wheels has a transmission ratio so dimensioned that the way of the longest crest corresponds to the longest dial rotation, this is to the digit Z–0 while the shorter crests correspond to the shorter dial rotations for the remaining dial letters and numerals.

When the sled has finished this back movement to the shown position, the telephone connection is made and remains open until deposition of the receiver dissolves the connection in known manner. The device is then immediately ready for repeated use.

I desire it understood that my invention is not confined to the particular embodiment shown and described, the same being merely illustrative, and that my invention may be carried out in other ways within the scope of the appended claims without departing from the spirit of my invention as it is obvious that the particular embodiment shown and described is only one of the many that may be employed to attain the objects of my invention.

Having described the nature of my invention, what I claim and desire to protect by Letters Patent is:

1. A telephone dialing device comprising a member adapted to be coupled with the rotary disk of a dial telephone and having a part forming a toothed wheel, a second toothed wheel positioned aside of the periphery of said first wheel and having an axle guided in the direction toward said first wheel whereby said second wheel can be moved into and out of engagement with said first wheel, a sled guided in a direction crossing the guided direction of said axle, a card-shaped plate attached to said sled and having a wavy groove slidably engaging said axle and extending in the guided direction of said sled whereby the waves of said groove, when said sled moves, shift said axle and thereby control engagement and disengagement of said wheels, and means rotating said second wheel.

2. A telephone dialing device comprising a cap adapted to embrace the central projection of a telephone dial, a finger affixed to said cap and adapted to engage a finger hole of said dial, a toothed wheel affixed on top of said cap, another toothed wheel positioned aside of the periphery of said first wheel and having an axle guided in the direction toward said first wheel whereby said second wheel can be moved into and out of engagement with said first wheel, a sled guided in a direction crossing the guided direction of said axle, a card-shaped plate attached to said sled and having a wavy groove slidably engaging said axle and extending in the guided direction of said sled whereby the waves of said groove, when said sled moves, shift said axle and thereby control engagement and disengagement of said wheels, and means rotating said second wheel.

3. A telephone dialing device comprising a member adapted to be coupled with the rotary disk of a dial telephone and having a part forming a toothed wheel, a second toothed wheel, positioned aside of the periphery of said first wheel and having an axle guided in the direction toward said first wheel whereby said second wheel can be moved into and out of engagement with said first wheel, a sled guided in a direction crossing the guided direction of said axle, a card-shaped plate attached to said sled and having a wavy groove slidably engaging said axle and extending in the guided direction of said sled whereby the waves of said groove, when said sled moves, shift said axle and thereby control engagement and disengagement of said wheels, driving means activated by movement of said sled in one direction and moving said sled back in the opposite direction, and a gear operated by said back driving means and rotating said second wheel.

4. A telephone dialing device comprising a member adapted to be coupled with the rotary disk of a dial telephone and having a part forming a toothed wheel, a second toothed wheel, positioned aside of the periphery of said first wheel and having an axle guided in the direction toward said first wheel whereby said second wheel can be moved into and out of engagement with said first wheel, a sled guided in a direction crossing the guided direction of said axle, a card-shaped plate attached to said sled and having a wavy groove slidably engaging said axle and extending in the guided direction of said sled whereby the waves of said groove, when said sled moves, shift said axle and thereby control engagement and disengagement of said wheels, driving means activated by movement of said sled in one direction and moving said sled back in the opposite direction, and a gear operated by said back driving means and rotating said second wheel, said gear containing a coupling operative in only one direction.

5. A telephone dialing device comprising a member adapted to be coupled with the rotary disk of a dial telephone and having a part forming a toothed wheel, a second toothed wheel positioned aside of the periphery of said first wheel and having an axle guided in the direction toward said first wheel whereby said second wheel can be moved into and out of engagement with said first wheel, a sled guided in a direction crossing the guided direction of said axle, a card-shaped plate attached to said sled and having a wavy groove slidably engaging said axle and extending in the guided direction of said sled whereby the waves of said groove, when said sled moves, shift said axle and thereby control engagement and disengagement of said wheels, a spring compressed by movement of said sled in one direction and moving said sled back in the opposite direction, a brake controlling the speed of said back movement, and a gear operated by said back movement and rotating said second wheel.

6. A device for making a gear operative during a series of periods comprising periods of different, predetermined lengths, said device comprising a guidedly shiftable pin controlling said gear, one position of said pin determining operativeness and another, shifted position of said pin determining idleness of said gear, and a card-shaped plate movable in a direction crossing said pin-shifting direction, said plate having a wavy groove extending in said crossing direction, said groove comprising wave crests engaging said pin in said operative position, wave bottoms engaging said pin in said idle position and further portions connecting said crest and bottom portions, said crest portions having lengths proportional to the lengths of said predetermined periods of operativeness.

7. A device for making a gear operative during a series of periods comprising periods of different, predetermined lengths, said device comprising a guidedly shiftable pin controlling said gear, one position of said pin determining operativeness and another, shifted position of said pin determining idleness of said gear, a card-shaped plate movable in a direction crossing said pin-shifting direction, said plate having a wavy groove extending in said crossing direction, said groove comprising wave crests engaging said pin in said operative position, wave bottoms engaging said pin in said idle position and further portions connecting said crest and bottom portions, said crest portions having lengths proportional to the lengths of said predetermined periods of operativeness, said plate being divided across its moving direction into a series of separable parts, each containing a groove portion including one crest, and a frame movable with said plate, said plate parts being exchangeably inserted in said frame.

8. A telephone dialing device comprising a member adapted to be coupled with the rotary disk of a dial telephone, and having a part forming a toothed wheel, a casing having an open bottom and a partially open top and being adapted to be placed about a dial telephone, hooks affixed on top of said casing, a frame positioned on top of said casing and engaging said hooks, said frame supporting movable elements including a second toothed wheel positioned aside of the periphery of said first wheel and having an axle guided in the direction toward said first wheel whereby said second wheel can be moved into and out of engagement with said first wheel, a sled guided in a direction crossing the guided direction of said axle, a card-shaped plate attached to said sled and having a wavy groove slidably engaging said axle and extending in the guided direction of said sled whereby the waves of said groove, when said sled moves, shift said axle and thereby control engagement and disengagement of said wheels, and means rotating said second wheel.

References Cited in the file of this patent

UNITED STATES PATENTS 2,426,600 Demeulenaere et al. ______ Sept. 2, 1947